United States Patent

[11] 3,554,468

| [72] | Inventor | James Marion McVicar<br>Trumbull, Conn. |
|---|---|---|
| [21] | Appl. No. | 825,600 |
| [22] | Filed | May 19, 1969 |
| [45] | Patented | Jan. 12, 1971 |
| [73] | Assignee | United Aircraft Corporation<br>East Hartford, Conn.<br>a corporation of Delaware |

[54] EXTERNAL LOAD STABILIZER
31 Claims, 13 Drawing Figs.

[52] U.S. Cl................................................ 244/137,
     294/81
[51] Int. Cl................................................. B64d 1/22
[50] Field of Search.................................... 244/137,
     138; 294/81, 81SF

[56]           References Cited
          UNITED STATES PATENTS
3,036,797  5/1962  Agusta........................ 294/81X

| 3,044,818 | 7/1962 | Tobey | 294/81 |
|---|---|---|---|
| 3,089,387 | 5/1963 | Damm | 244/137X |
| 3,227,401 | 1/1966 | Currier | 244/137 |
| 3,330,509 | 7/1967 | Barchet | 244/137 |

*Primary Examiner*—Milton Buchler
*Assistant Examiner*—James E. Pittenger
*Attorney*—Vernon F. Hauschild

ABSTRACT: A load stabilizer is attached to an aircraft and projects therefrom and is shaped so that as a load is elevated on a winch, either projections on the load or the load-carrying beam engage a continuous cam member contoured to intercept the load projections or the load beam and guide the beam into a retaining slot so as to stabilize the load in a selectively oriented position and without respect to the attitude or orientation of the load during the load-elevating process.

PATENTED JAN 12 1971

INVENTOR
JAMES MARION McVICAR

BY Vernon F. Hauschild
ATTORNEY

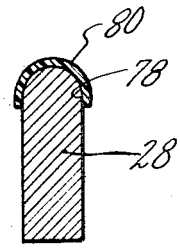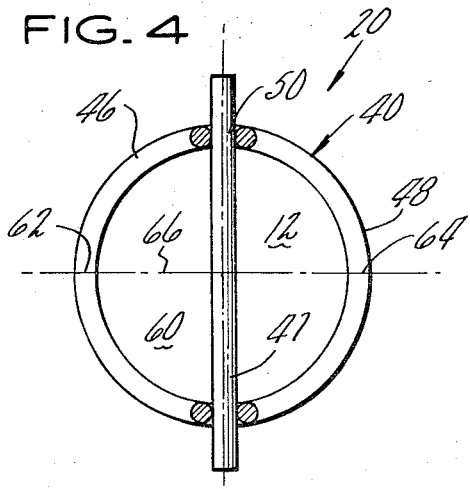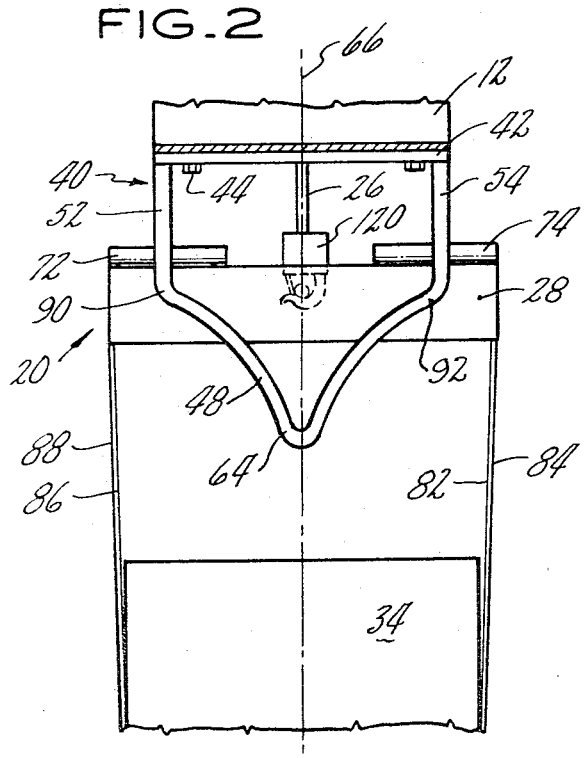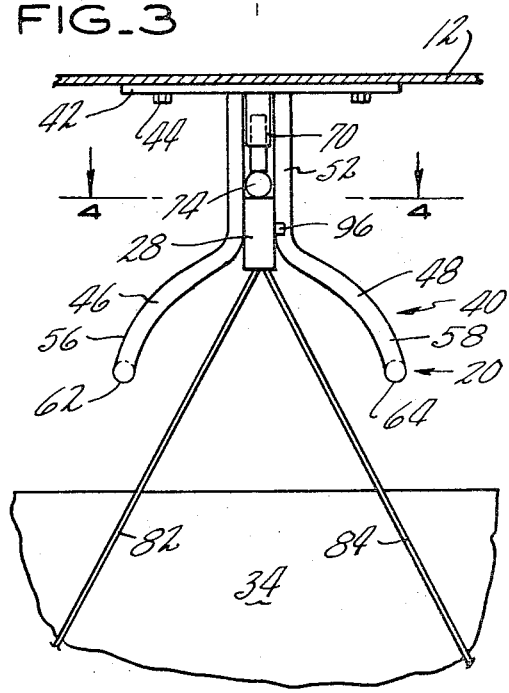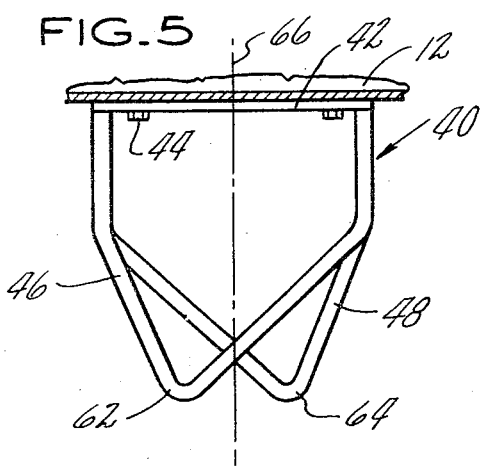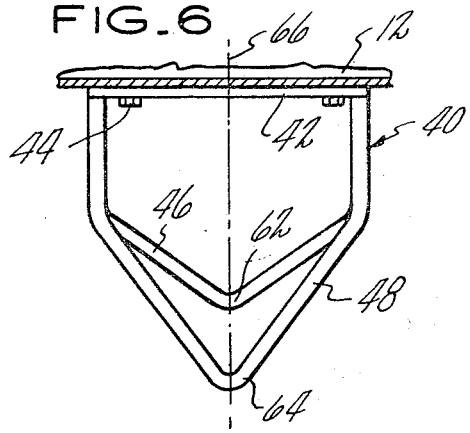

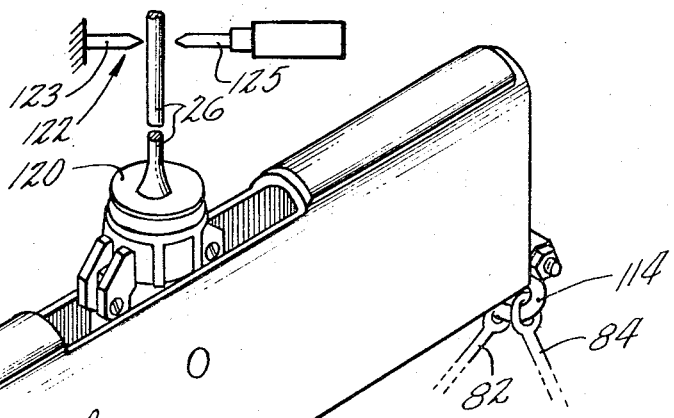
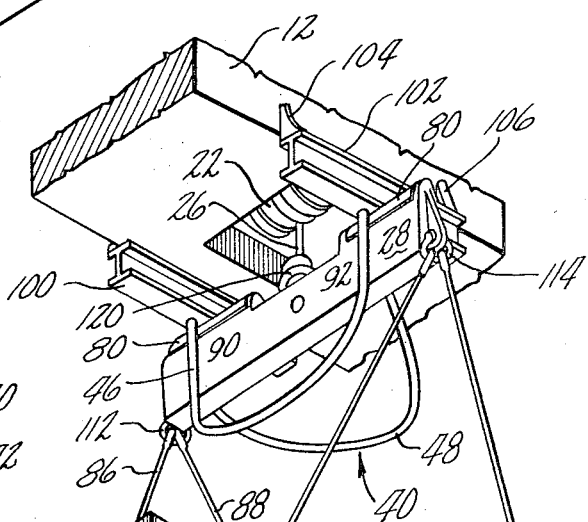
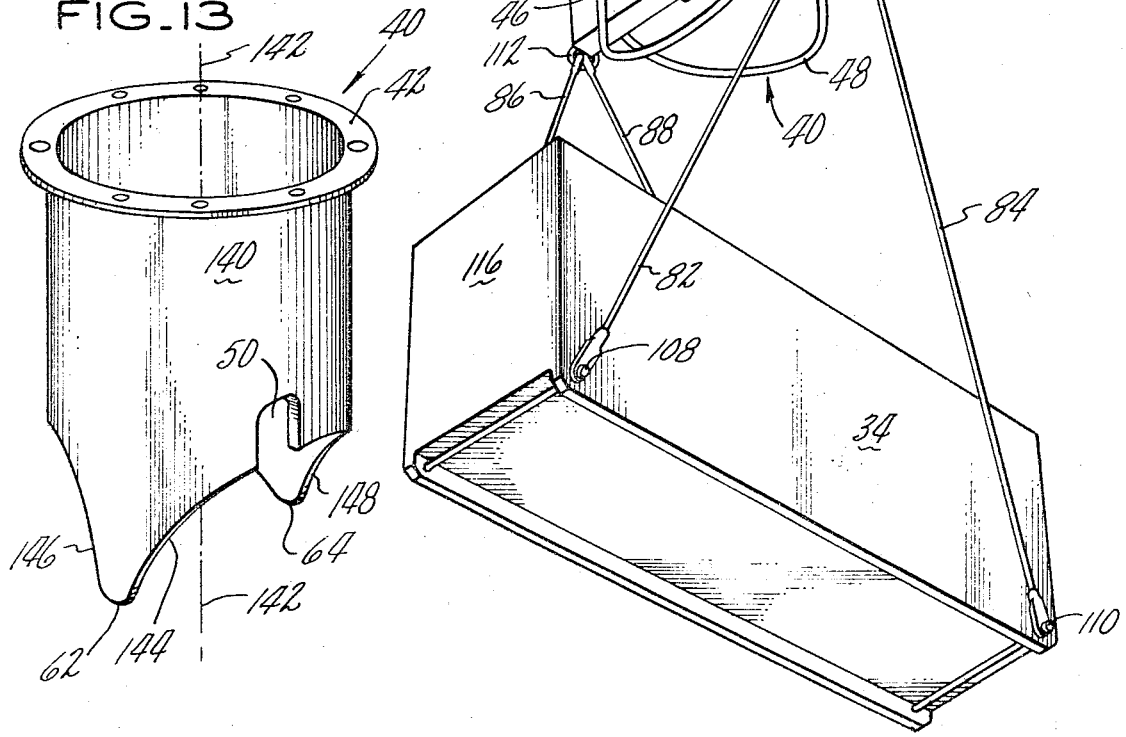

EXTERNAL LOAD STABILIZER

BACKGROUND OF THE INVENTION

1. Field of Invention

This invention relates to cargo-handling equipment and more particularly to a system adapted to carry a cargo-type load external of an aircraft from a single cable but with maximum load stability.

2. Description of the Prior Art

In the cargo-handling field, especially in the handling of cargo which is to be connected to and carried externally of an aircraft in flight and possibly even raised to its in-flight position from a hovering helicopter, there is substantial benefit from a load jettisoning standpoint in a cargo-handling system wherein the load is suspended from a single cable. Such a system is of minimum weight, minimum complexity, and the severing of the single cable or opening the cargo hook serves to jettison the load. This single cable system, however, produces aircraft in-flight problems because, due to aerodynamic loading, the load will fly broadside to the wind; that is, with its widest area facing the wind and a yawing action of the load is caused thereby and this limits the flight speed of an aircraft, such as a helicopter, to approximately 50 knots.

To prevent this yawing action in a single cable suspension system, drogue chutes have been used, but are not fully satisfactory since they not only create substantial drag in and of themselves but also cause the load to be pulled rearwardly so as to increase its total frontal area, thereby further increasing the drag problem.

As a further effort to avoid the load yawing in a single point suspension system, attempts have been made to suspend the load from a single cable which is joined through proper connecting mechanism to four cables which in turn attach to the corners of the load. A rectangular frame projects downwardly from the bottom of the aircraft and, when the load is raised, it is raised to a point where the four cables are wedged into the four corners of the rectangular frame. Experience has shown, however, that the aerodynamic yawing force on the load is so severe during flight that the cables do not remain in these corner positions due to lack of tension therein, and the yawing instability problem returns in flight despite the frame arrangement. This type of arrangement is acceptable for low speed flight but is totally unacceptable at the more desirable speeds of 120 knots or more.

This in-flight yawing problem of an externally carried load can be improved if a multipoint suspension is incorporated between the load and the aircraft. In such a system, a cable may be run from each corner of the load to individual winches aboard the aircraft and the taught in-flight condition of each of the four cables in such a suspension system produces yaw stability. While the multipoint suspension system has the advantage of yaw stability, it has the disadvantage of being extremely heavy in that a substantial amount of additional equipment is needed, the various winches must be synchronized in action for load leveling purposes, and load jettisoning presents a substantial problem because it is difficult to release all four cables simultaneously, and a hang-up of any of the cables after one or more is released causes flight instability in the aircraft.

Arrangements have been attempted wherein cargo-carrying load beams are brought into selected oriented positioned and then locked in that position for flight operation. Such systems have proved extremely troublesome because they all require that the load beam reach its final resting position at the station of the locks, and this is impossible to accomplish without either aircraft or load maneuvering.

Other attempts at multipoint suspension systems are shown in U.S. Pat. Nos. 3,265,336 and 2,953,300; but it is evident that these systems also contain much additional equipment and present the increased jettisoning problem over the single point suspension system.

Load beams and load beam restraints have been attempted in the past, for example, in British Pat. No. 807,750, however, as explained therein, it was a hit-and-miss proposition wherein, unless the load was raised in proper orientation, the beam would miss the restraint and the load would have to be lowered and raised a sufficient number of times so that due to chance, load maneuvering and/or aircraft maneuvering, the load beam eventually engaged the restraint.

SUMMARY OF THE INVENTION

A primary object of the present invention is to provide a load-carrying scheme which has the advantage of the simplicity, lightness and jettisonability of the single point suspension system but which has the flight stability of a multipoint suspension system, without the added weight and complicated synchronizing mechanisms needed in a multipoint suspension.

In accordance with the present invention, a single point suspension system with yaw restraint is provided by utilizing a single lift cable projecting from a single drummed winch which connects to a load beam to which the load is attached, and wherein the load beam engages a continuous guidance cage when being elevated to the aircraft, which guidance cage, without respect to the orientation of the load and load beam, will cause the load beam to be cammed or guided to a position of selected orientation wherein the load beam and hence the load are held in two point yaw restraint. Single point suspension and pickup eliminates need for aircraft orientation overload so that the aircraft can hover into the wind independent of load.

In accordance with a further aspect of the present invention, shock absorbers or other buffers are provided to prevent the load beam from butting hard against the fuselage of the aircraft, thereby causing either fuselage or load-handling equipment damage. In addition, a limit switch may be used to shutoff the winch when the load beam is a short distance from its final restraint position compensating for winch overrun.

In accordance with a further aspect of the present invention, the load may be jettisoned at the will of the pilot with maximum ease.

In accordance with still a further aspect of the present invention, a guidance cage is provided which includes mechanism to attach the cage assembly to the aircraft and wherein the guidance cage is a continuous cam and consists of two U-shaped members with the legs of the members positioned in spaced relation parallel to the plane of selected orientation of the load and wherein the closed ends of the U-shaped members are flared away from one another to present an enlarged area line to the restraint slot defined between the legs of the spaced U-shaped members. In addition, to insure that despite the continuity of the guide cage and the continuous slope change shape of the U-shaped members so that the load beam or load never bottoms against the lower tips of the U-shaped members, these lower tips may be set in offset relation with respect to the plane perpendicular to the selected orientation position for the load beam and, further, wherein said U-shaped members project different distances from the aircraft so that the load beam or load will engage one such U-shaped member and the camming action thereof will be commenced before the load beam or load engages the second such member.

In accordance with another aspect of this invention, a cargo-handling system is taught which includes mechanism which is fully removable from the aircraft so that the aircraft may be flown without the mechanism, such as the guidance cage, and thereby eliminate aerodynamic drag which would be caused by projection of the guidance cage into the atmosphere during flight.

In accordance with another aspect of the present invention, a system is provided wherein the guidance cage can be elevated to an aircraft without the requirement for special ground handling equipment.

In accordance with still another aspect of this invention, the load beam is fabricated so that there is minimum friction between the load beam and the guidance cage. This is accomplished either by placing rollers at the top of the load beam, by rounding the top of the load beam and preferably putting, thereover, antifriction stripping, such as Teflon sheets or utilizing other antifriction procedures or mechanisms.

In accordance with still a further aspect of this invention, there are multiple variations of connection between the hoisting cable and the load beam and the connection between the load beam and the load.

BRIEF DESCRIPTION OF THE DRAWINGS

FIGS. 2, 3, and 4 show a preferred embodiment of this invention in greater particularity, FIG. 4 being a section along line 4—4 of FIG. 3.

FIG. 5 shows a modified form of my guidance cage with the pointed end portions thereof set in offset relation.

FIG. 6 shows another modification of my guidance cage with the opposite sides thereof projecting different distances from the aircraft.

FIG. 7 is a cross-sectional showing of a load beam with preferred antifriction construction.

FIG. 8 shows another embodiment of our invention connected to an aircraft by a modified connecting means.

FIG. 9 is an enlarged showing of one type of load beam.

FIG. 13 shows another modification of my guidance cage.

DESCRIPTION OF THE PREFERRED EMBODIMENT

Figure 1:
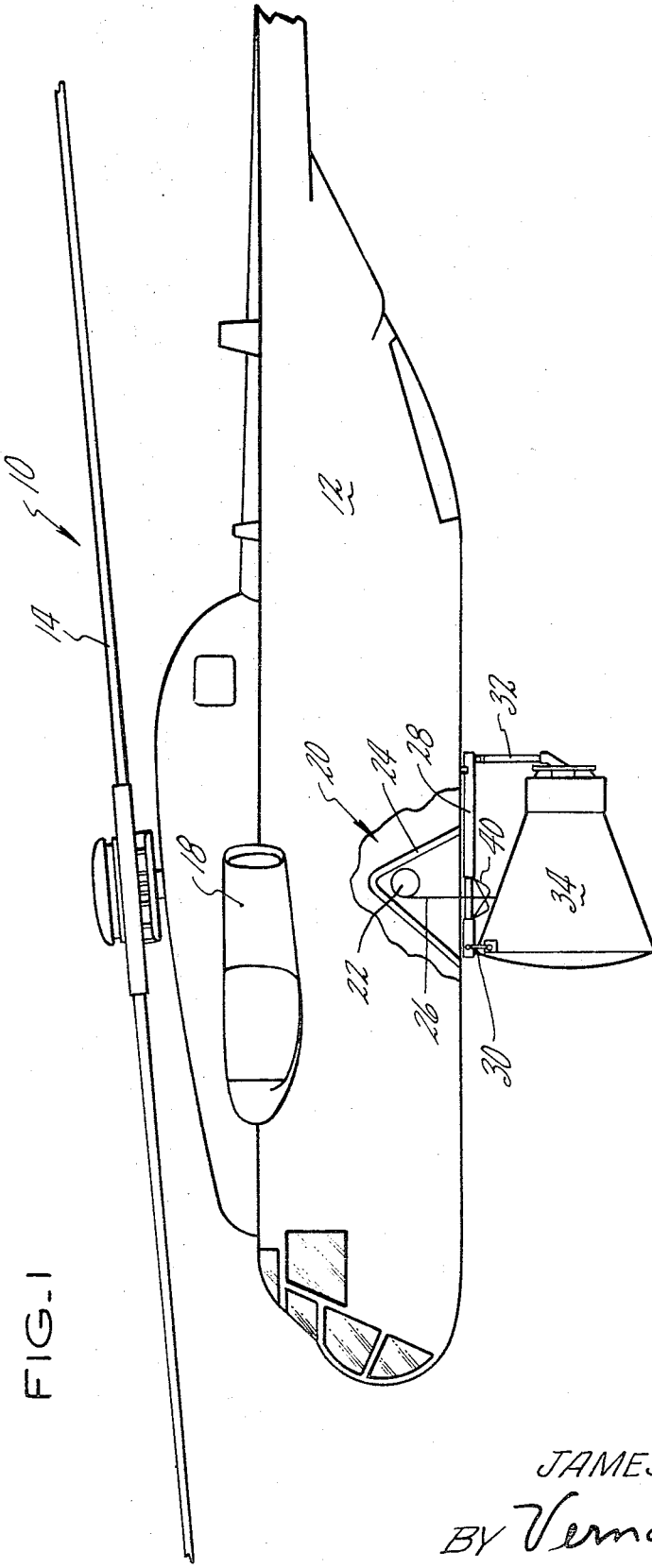
FIG. 1 is a showing of a modern aircraft, in particular a helicopter, utilizing the cargo-handling equipment of my invention.

Referring to FIG. 1 we see modern aircraft 10, in the form of a helicopter, which includes fuselage 12 supporting conventional main rotor 14 and conventional tail rotor (not shown). The main rotor 14 and tail rotor are driven in conventional fashion by one or more engines 18, which may be of any conventional type. Fuselage 12 in FIG. 1 is shown partially broken away to illustrate the load-handling unit 20 of this invention. Aircraft 10 may be of the type shown and described in U.S. Pat. Nos. Des. 197,823 and Des. 193,492.

Load-handling unit 20 includes drum and winch mechanism 22, which may be either manually operated or motor driven, and which may be of the type shown in greater particularity in U.S. Pat. No. 2,403,099. Winch mechanism 22 is supported within fuselage 12 by frame-type support mechanism 24, of conventional design. Winch-drum mechanism 22 causes hoist cable 26 to be either wound onto or paid-out from the drum of winch mechanism 22, thereby either elevating or lowering any load attached to hoist cable 26. At its free end, hoist cable 26 connects to load beam 28 at some station intermediate the ends of load beam 28 and load cables or other conventional connectors 30 and 32 project from the opposite ends of load beam 28 and connect to load 34, to thereby cause the load 34 to be elevated or lowered as hoist cable 26 is wound onto or paid-out from drum-winch 22.

To cause load 34 to be carried in a position of optimum selected orientation, during the course of elevating the load, the load beam 29 contacts and is thereby caused to move by a camming action, guidance cage assembly 40, to be described in greater particularity hereinafter. While load beam 28 is shown secured in a fore-and-aft orientation or direction in FIG. 1, it should be born in mind that, depending upon the shape and size of the load, guidance cage assembly 40 can be fabricated to orient the load beam and hence the load into any desired finally oriented position, such an athwartship.

Referring to FIGS. 2—4, we see guidance cage assembly 40 in greater particularity in an environment which causes the load beam 28 to be in a finally secured oriented position when extending in a transverse or athwartship position. Guidance cage assembly 40 is connected to the fuselage 12 of the aircraft by any convenient connecting means, for example, by connecting ring 42, which is connected to the bottom of fuselage 12 by any convenient means, such as bolt mechanisms 44. Two substantially U-shaped rod members 46 and 48 are connected to and project from connecting ring 42 and are oriented so that they extend substantially perpendicular to fuselage 12 and positioned substantial equal distances on opposite sides of the plane 47 of final load beam and load orientation and parallel thereto to define load beam restraint slot 50 therebetween. Each of the U-shaped members 46 and 48 comprise two rod members, such as members 52 and 54, (see FIG. 2) which form the legs of the U and which extend perpendicular to the fuselage 12 and lie in a plane parallel to the plane of finally selected orientation 47 of beam 28. Each of U-shaped rod members 46 and 48 also include closed ends, 56 and 58, which extend from the rod members, such as 52 and 54, and cooperate therewith in defining U-shaped members 46 and 48. These closed ends 56 and 58 flare outwardly in opposite directions from the finally selected plane 47 for load beam 28, as best shown in FIG. 3, so as to be preferably symmetrically with respect thereto and so as to form enlarged area entry or inlet 60 to restraint slot 50. Preferably, U-shaped rod members 48 and 60 include at their farthest most station from fuselage 12, a substantially pointed section 62 and 64, which may lie in plane 66, which is perpendicular to the final orientation plane 47 of beam 28. To avoid the possibility of having load beam 28 parallel to offset from plane 66, thereby causing it to ride up the wrong side of one of the camming surfaces and jam in the event of a loading situation wherein the aircraft is roller with respect to the load, it might be desirable to position tips 62 and 64 on opposite sides of plane 66, as shown in FIG. 5. In the alternative or in combination with the FIG. 5 construction, it might be advisable to cause U-shaped rod members 46 and 48 to project different distances from fuselage 12 so that load beam 28 will contact one of the point sections, 62 or 64, before the other such point section so that the camming action of the first U-shaped member commences so as to move load beam 28 out of plane 66 before the load beam contacts the other U-shaped rod member. As best shown in FIG. 6, U-shaped rod member 48 may be made longer than U-shaped rod member 46 to accomplish this function.

So that neither fuselage 12 nor load carrying mechanism 20 is damaged during the load elevating procedure, it is preferable that, as shown in FIG. 3, bumper mechanisms 70 which may be conventional air-oil shock absorbers be positioned selectively within restraint slot 50 or elsewhere to intercept beam 28 a selected distance before it reaches its final resting position to prevent dynamic butting between beam 28 and fuselage 12.

In addition, to reduce friction between load beam 28 and guidance cage assembly 40, rollers, such as 72 and 74, may be positioned on top of load beam 28. In another modification of load beam 28, shown in FIG. 7, the load beam may be shaped to have a rounded top 78 extending the length thereof or selected distances thereon and may be used either in this condition or with a sheet 80 of antifriction material, such as Teflon, bonded thereto as a means of reducing friction between load beam 28 and guidance cage assembly 40.

By viewing FIGS. 2—4, it will be seen that in my load handling unit 20, when load beam 28 is in its final resting position, although my system provides the simplicity of a single point suspension system, the load beam 28 and hence load 34, which is suspended therefrom by load cables 82 and 84 and 86 and 88 at opposite ends thereof, is held in two-point yaw restraint at stations 90 and 92.

When load 34 is being raised by a mechanized winch system, and since there is always overrun in such a system, it may be desirable to provide limit switch 96 in communication with restraint slot 50 at a selected distance from the eventual uptight position of load beam 28, so that when the load beam actuates limit switch 96, this serves to stop or deenergize the winch driving motor so that the winch does not overrun and thereby cause a very hard butting action between the fuselage and the load beam 28, thereby possibly severing cable 26.

Referring to FIG. 8 we see my invention utilizing a second mechanism to attach guidance cage assembly 40 to fuselage 12 and to carry load beam 28 in athwartship orientation. U-shaped rod members 46 and 48 are connected to I-beams 100 and 102 which are in turn connected to fuselage 12 by connecting members 104 and 106 which may be connected in any convenient way, such as bolting to both the I-beams and fuselage. Load beam 28 is shown in its final flight oriented position in the FIG. 8 arrangement and load 34 is suspended therefrom by cables 82—88, which connect pivotally to opposite corners of the load at connecting points 108 and 110 and which pivotally connect to shackle members 112 and 114 at opposite ends of load beam 28. It will be noted that in the FIG. 8 construction, load 34 assumes an attitude to present minimum frontal area in the form of surface 116 to thereby produce minimum drag during flight and the stability of the load in flight is maximum because of the four-point suspension system illustrated. This stability is materially aided by the fact that the four-point suspension system originates in two hard points at shackles 112 and 114 due to the positive retention of load beam 28 at the two athwartship stations 90 and 92. As described in greater particularity hereinafter, single hoist cable 26 is connected to load beam 28 by either a swiveling or hook connection at a selected station between the ends of beam 28.

It will now be illustrated that with my invention, there are many possible connections between the load beam 28 and the load and the winch. For example, as best shown in FIG. 9, single hoist cable 26 is pivotally connected to the top of load beam 28 through swivel connection 120. The load is connected to beam 28 in four-point suspension by the load cables 82—88 which are fixedly connected in pivot relation to shackles 112 and 114. When the FIG. 9 construction is utilized, it is preferable to have a guillotine mechanism 122, which may include fixed knife 123 and solenoid actuated knife 125 and which is pilot actuated in any conventional fashion, to sever single hoist cable 26 and hence jettison the load at the desire of the pilot. The FIG. 9 construction has the advantage that there is not a cargo hook connection between hoist cable 26 and load beam 28, and hence the weight of a cargo hook, approximately 90 lbs., need not be carried by the aircraft at all times. In addition, although the guillotine mechanism 122 is an added mechanism, the FIG. 9 construction is easily jettisonable in view thereof. In the FIG. 9 construction, by merely disconnecting the swivel connection 120, the aircraft may be flown without having to carry load beam 28 and any connecting means between cable 26 and load beam 28.

Figure 11:
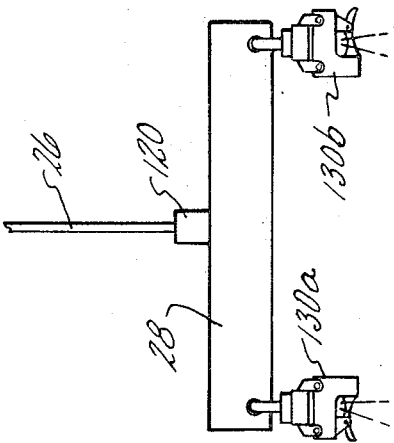
Figure 10:
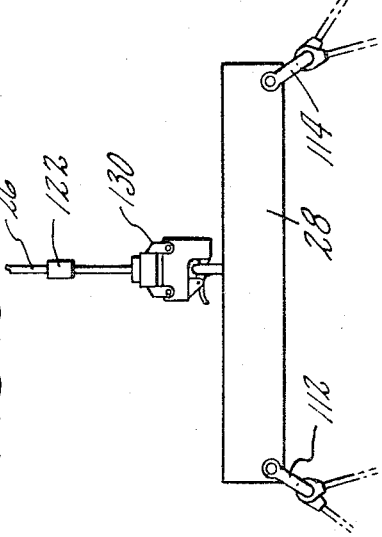

Another variation as shown in FIG. 10 wherein single hoist cable 26 is connected to beam 28 by releasable hook 130, which may be of the type disclosed in U.S. Pat. Nos. 3,032,365 and 3,265,336 and which is actuatable at pilot command to jettison the load and beam 28. Shackles 112 and 114 are positioned at opposite ends of beam 28 and serve to support the load from the beam as described previously in connection with FIG. 9. The FIG. 10 construction has the advantage that it is easily jettisonable from a single point suspension by actuation of Still another variation is shown in FIG. 11 wherein single hoist cable 26 is connected to beam 28 by swivel mechanism 120 and releasable hooks 130a and 130b, of the type disclosed in connection with FIG. 10, are positioned at opposite ends of beam 28 and support the load in four-point suspension fashion therefrom as described in connection with FIG. 9. This system provides the advantage that the hook 130 of the FIG. 10 construction need not be carried at all times but has a disadvantage, in jettisoning the load, of having to actuate release hooks 130a and 130b simultaneously to avoid a load hang-up and the attendant disadvantage thereof should only one of the hooks release.

Figure 12:
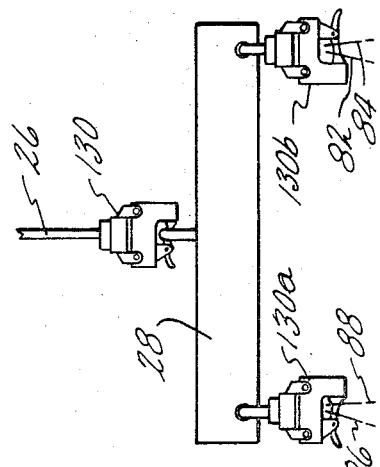
FIGS. 10, 11, and 12 show modified connecting means between the load beam and the cargo hoist and between the load beam and the load being elevated to the aircraft.

Still another variation is shown in FIG. 12 wherein releasable hook 130 connects single hoist cable 26 to beam 28 and releasable hooks 130a and 130b connect the load in four-point suspension to opposite ends of beam 28. The FIG. 11 construction need not carry load cables when no load is being carried and FIG. 12 permits removal of both the load cables 82—88 and load beam 28.

FIG. 13 shows a modified form of guidance cage 40 which attaches to the aircraft through bolt ring 42, and which consists of cylindrical member 140 positioned concentrically about axis 142 and which is substantially perpendicular to fuselage 12. The outer end of member 140 is selectively shaped to define continuous cam 144 which is shaped to define two detention slots 50 with symmetrically contoured surfaces 146 and 148 extending on opposite sides thereof and culminating in point sections 62 and 64, respectively. If desired, detention slot 50 could abut or be in close proximity to bolt ring 42.

It will be noted that in both the FIG. 2—6 and FIG. 8 constructions, the guidance cage assembly 40 is readily detachable from the aircraft and it is not necessary to carry system 40 on the aircraft and hence create undesirable aerodynamic drag and weight, when the aircraft is not going to be used for cargo-handling operation.

In view of the previous description, it will be seen that my load-handling unit 20 includes the advantages of simplicity, minimum weight, and jettisonability of a single point suspension system, together with the load in-flight stability of a multipoint system without the added weight of a conventional multipoint system and without the complexity of synchronization between lifting winches and the like which are necessary in a conventional multipoint system to cause the cables to be wound in at the same rate of speed, and further, without the cargo jettisoning problems of a multipoint suspension system.

While we have described herein a system wherein a load is being elevated by the use of a load beam, it will be evident to those skilled in the art that with a properly contoured load or with a load having properly contoured projections extending therefrom, my load-handling unit 20 may be used without a load beam 28 in that the guidance cage assembly 40 will be contacted by and selectively orient the properly shaped load or the properly shaped and positioned projections from the load.

It will be obvious to those skilled in the art that if a double winch mechanism is desired due to, for example, an extremely heavy load situation, a single cable from each winch could be attached by any of the methods taught herein to the opposite ends of the load beam 28.

I claim:
1. An aircraft having load elevating and lowering means including:
   a. a winch;
   b. a single cable connected to said winch for either winding thereon or unwinding therefrom to thereby hoist or lower the load connected thereto;
   c. a load-stabilizing beam;
   d. means connecting said load-stabilizing beam to said single cable;
   e. a cargo-handling and orientating mechanism adapted to be connected to the aircraft and including:
      1. a member, generally circular in plan view, shaped to define a restraining slot diametrically thereacross and to further define two substantially symmetrically opposed point sections at the farthest stations from said slot and to still further define smooth camming surfaces between said points and said slot so that any member extending beyond said generally circular member will be cammed into said slot by coaction with said camming surfaces;
      2. means adapted to connect said generally circular member to the exterior of an aircraft in such a position that said slot lies in the plane of desired orientation of the load and with the member surrounding the single cable so that as the winch elevates a load, the load-stabilizing beam will engage said camming surfaces and be guided thereby into said slot.

2. Apparatus according to claim 1 and including cargo-jettisoning means.

3. Apparatus according to claim 1 and including redundant cargo-jettisoning means.

4. Cargo-handling and orientating mechanism adapted for use with an aircraft including:
   a. a member, generally circular in plan view, shaped to define a restraining slot diametrically thereacross and to further define two substantially symmetrically opposed point sections at the farthest stations from said slot and to still further define smooth camming surfaces between said points and said slot so that any member extending beyond said generally circular member will be cammed into said slot by coaction with said camming surfaces;
   b. means adapted to connect said generally circular member to the exterior of an aircraft in such a position that said slot lies in the plane of desired orientation of the member.

5. Apparatus according to claim 4 wherein said connecting means is of the quick connect-disconnect type.

6. A guidance cage adapted to be connected to an aircraft and to securely position a load or load-stabilizing bar in selected orientation when being carried by the aircraft and including:
   a. means to connect the guidance cage to the aircraft in selected oriented position;
   b. a first guide member connected to and supported by said connected means and including:
      1. two-spaced rod members positioned to project substantially perpendicular from the aircraft toward the load and lying in a plane substantially parallel to the plane of selected load orientation;
      2. a closed loop rod member projecting from said spaced rod members and forming a continuation thereof and shaped to flare therefrom in a direction away from said plane of selected load orientation;
   c. a second guide member connected to and supported by said connecting means and including:
      1. two-spaced rod members positioned to project substantially perpendicular from the aircraft and lying in a plane substantially parallel and in spaced relation to said two rod members of said first guide member to form a restraint slot therebetween;
      2. a closed loop rod member projecting from and connected to said two rod members and shaped to flare therefrom in a direction away from the plane of selected load orientation and in a direction opposite the flare of the closed loop rod members of the first guide member.

7. Apparatus according to claim 1 wherein one of said guide members extends farther from said connecting means than the other so that the enlarged area entry to the restraint slot is canted, thereby necessitating that the load projection or cargo bar being raised will contact one of the guide members and commence its orientation by contact therewith during further load raising before it contacts the other guide member.

8. Apparatus according to claim 1 wherein the closed ends of said guide members culminate in a substantial tip and wherein said tips lie on opposite sides of a plane extending perpendicular to and located substantially midway between the spaced rod members of said guide members.

9. A guidance cage assembly adapted to be connected to an aircraft and to cause a load being elevated to the aircraft to be carried thereby externally during flight to achieve a selected oriented position and including:
   a. means adapted to connect said guidance cage assembly to said aircraft in selected oriented position;
   b. a first substantially U-shaped guidance rod connected to and supported by said connecting means and projecting therefrom so that the legs of the U extend substantially perpendicular to the aircraft and lie in a plane substantially parallel to the plane of selected load orientation and wherein the closed end of the U flares outwardly from the legs of the U;
   c. a second substantially U-shaped rod connected to and supported by said connecting means and oriented so that the legs of the U project substantially parallel to the aircraft and are parallel to the legs of the first U-shaped rod and spaced therefrom to define a restraint slot therebetween extending in the direction selected load orientation and wherein the closed end of the U flares outwardly from the legs of the U in a direction opposite to the direction of the flare of the closed end of the first U-shaped rod so as to cooperate therewith in defining a continuous, enlarged area entry to said restraining slot.

10. Apparatus according to claim 9 wherein one of said U-shaped rods extends farther from said connecting means than the other so that the enlarged area entry to the restraint slot is canted, thereby necessitating that the load projection or cargo bar being raised will contact the closed end of one of the U-shaped rods and commence its orientation by contact therewith during further load raising before it contacts the closed end of the other U-shaped rod.

11. Apparatus according to claim 9 wherein the closed ends of said U-shaped rods culminate in a substantial tip and wherein said tips lie on opposite sides of a plane extending perpendicular to and located substantially midway between the legs of said U-shaped rods.

12. An aircraft having load elevating and lowering means including:
   a. a winch;
   b. a single cable connected to said winch for either winding thereon or unwinding therefrom to thereby hoist or lower the load connected thereto;
   c. a load stabilizing beam;
   d. means connecting said load stabilizing beam to said single cable;
   e. a guidance cage assembly adapted to be connected to the aircraft and to cause a load being elevated to the aircraft to be carried thereby externally during flight to achieve a selected oriented position and including:
      1. means adapted to connect said guidance cage assembly to said aircraft in selected oriented position and to envelope said single cable;
      2. a first substantially U-shaped guidance rod connected to and supported by said connecting means and projecting therefrom so that the legs of the U extend substantially perpendicular to the aircraft and lie in a plane substantially parallel to the plane of selected load orientation and wherein the closed end of the U flares outwardly from the legs of the U;
      3. a second substantially U-shaped rod connected to and supported by said connecting means and oriented so that the legs of the U project substantially parallel to the aircraft and are parallel to the legs of the first U-shaped rod and spaced therefrom to define a restraint slot therebetween extending in the direction selected load orientation and wherein the closed end of the U flares outwardly from the legs of the U in a direction opposite to the direction of the flare of the closed end of the first U-shaped rod so as to cooperate therewith in defining a continuous, enlarged area entry to said restraining slot so that as the winch elevates a load, the load-stabilizing beam will engage said U-shaped rods and be guided thereby into said restraint slot.

13. Apparatus according to claim 12 wherein said connecting means between said load beam and said cable is a swiveling means.

14. Apparatus according to claim 12 wherein said connecting means between said load beam and said single cable is a releasable cargo hook.

15. Apparatus according to claim 12 and including rolling members positioned on the top of said load to claim 12 and including rolling members positioned on the top of said load beam and positioned to contact said U-shaped rods of said guidance cage assembly in rolling relation to establish minimum friction therebetween as said load beam is elevated into said restraint slot.

16. Apparatus according to claim 12 and wherein said load beam is shaped to have a rounded top side.

17. Apparatus according to claim 16 and including a layer of low friction material covering the curved top of said load beam.

18. Apparatus according to claim 12 and including bumper means positioned to be intercepted by said load beam in said restraint slot to minimize shock to the aircraft when said load beam is raised to its fully elevated restrained position in said restrained slot.

19. Apparatus according to claim 18 wherein said bumper means includes shock-absorbing means.

20. Apparatus according to claim 12 and including means to jettison said load beam.

21. Apparatus according to claim 12 and including two load cables connected to the opposite ends of said load beam and further including means to connect said load cables to the opposite end of said load beams.

22. Apparatus according to claim 21 and wherein said means connecting said load beam to said single hoist cable is a swivel connection and wherein said means connecting said two load cables to opposite ends of said beams is a releasable cargo hook.

23. Apparatus according to the claim 21 wherein said means connecting said single hoist cable to said load beam is a releasable cargo hook and wherein said means connecting said cargo cables to the opposite ends is a positive fixed connecting means.

24. Apparatus according to claim 21 wherein said means connecting said single hoist cable to said load beam is a releasable cargo hook and wherein said means connecting said two load cables to the opposite ends of said load beam are releasable cargo hooks.

25. Apparatus according to claim 12 and including means to jettison the load.

26. Apparatus according to claim 12 and including cutoff means selectively positioned with respect to said restraint slot so as to be actuated by said load-stabilizing beam to cutoff winch operation during the load-elevating process.

27. Apparatus according to claim 12 and including redundant means to jettison the load.

28. An aircraft having load elevating and lowering means including:
 a. a winch,
 b. a single cable connected to said winch for either winding thereon or unwinding therefrom to thereby hoist or lower the load connected thereto,
 c. a load stabilizing beam,
 d. means connecting said load stabilizing beam to said single cable,
 e. a guidance cage adapted to be connected to the aircraft and to securely position a load or load stabilizing bar in selected orientation when being carried by the aircraft and including:
  1. means to connect the guidance cage to the aircraft in selected oriented position and enveloping said single cable,
  a first guide member connected to and supported by said connected means and including:
   A. two spaced rod members positioned to project substantially perpendicular from the aircraft toward the load and lying in a plane substantially parallel to the plane of selected load orientation,
   B. a closed loop rod member projecting from said spaced rod members and forming a continuation thereof and shaped to flare therefrom in a direction away from said plane of selected load orientation,
  3. a second guide member connected to and supported by said connecting means and including:
   A. two spaced rod members positioned to project substantially perpendicular from the aircraft and lying in a plane substantially parallel to the plane of selected load orientation and in spaced relation to said two rod members of said first guide member to form a restraint slot therebetween,
   B. a closed loop rod member projecting from and connected to said two rod members and shaped to flare therefrom in direction away from the plane of selected load orientation and in a direction opposite the flare of the closed loop rod members of the first guide member so that the winch elevates a load, the load stabilizing beam will engage said guide members and be guided thereby in the restraint slot.

29. Apparatus according to claim 28 and including means to jettison the load.

30. Apparatus according to claim 28 and including cutoff means selectively positioned with respect to said restraint slot so as to be actuated by said load-stabilizing beam to cutoff winch operation during the load-elevating process.

31. Apparatus according to claim 28 and including redundant means to jettison the load.

PO-1050
(5/69)

UNITED STATES PATENT OFFICE
CERTIFICATE OF CORRECTION

Patent No. 3,554,468           Dated January 12, 1971

Inventor(s) James M. McVicar

It is certified that error appears in the above-identified patent and that said Letters Patent are hereby corrected as shown below:

Claim 6, Line 38, Column 7      After "parallel" insert
                                --to the plane of selected
                                load orientation--

Claim 15, Line 68, Column 8     After "load" insert --beam--

Signed and sealed this 13th day of April 1971.

(SEAL)
Attest:

EDWARD M. FLETCHER, JR.          WILLIAM E. SCHUYLER, JR.
Attesting Officer                Commissioner of Patents